(12) United States Patent
Ogino et al.

(10) Patent No.: US 8,171,294 B2
(45) Date of Patent: May 1, 2012

(54) ADDITIONAL-INFORMATION DETECTION PROCESSING APPARATUS AND METHOD, CONTENT PLAYBACK PROCESSING APPARATUS AND METHOD, AND COMPUTER PROGRAM

(75) Inventors: Akira Ogino, Tokyo (JP); Takashi Kohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 976 days.

(21) Appl. No.: 10/407,234

(22) Filed: Apr. 7, 2003

(65) Prior Publication Data

US 2004/0003253 A1    Jan. 1, 2004

(30) Foreign Application Priority Data

Apr. 11, 2002 (JP) ................................. 2002-109723

(51) Int. Cl.
*H04L 29/06* (2006.01)
(52) U.S. Cl. ........................................ 713/176; 705/75
(58) Field of Classification Search .................... 713/176
See application file for complete search history.

(56) References Cited

U.S. PATENT DOCUMENTS

| | | | | |
|---|---|---|---|---|
| 5,923,780 | A * | 7/1999 | Morfill et al. .................. | 382/195 |
| 6,215,748 | B1 * | 4/2001 | Greenwood et al. ........ | 369/53.31 |
| 6,351,567 | B1 * | 2/2002 | McVeigh et al. .............. | 382/238 |
| 6,415,040 | B1 * | 7/2002 | Linnartz et al. ............... | 382/100 |
| 6,425,004 | B1 * | 7/2002 | Hardjono ...................... | 709/223 |
| 6,546,112 | B1 * | 4/2003 | Rhoads ......................... | 382/100 |
| 6,601,217 | B1 * | 7/2003 | Smith ............................ | 714/822 |
| 6,996,543 | B1 * | 2/2006 | Coppersmith et al. .......... | 705/50 |
| 7,012,906 | B1 * | 3/2006 | Song .............................. | 370/335 |
| 7,266,121 | B2 * | 9/2007 | Raisanen ....................... | 370/392 |
| 7,428,270 | B1 * | 9/2008 | Dubuc et al. .................. | 375/316 |
| 7,457,303 | B2 * | 11/2008 | Blumrich et al. ............. | 370/406 |
| 7,757,101 | B2 * | 7/2010 | Nonaka et al. ................ | 713/194 |
| 7,787,480 | B1 * | 8/2010 | Mehta et al. .................. | 370/401 |
| 2002/0059575 | A1 * | 5/2002 | Watts et al. ....................... | 725/1 |
| 2002/0069179 | A1 * | 6/2002 | Slater et al. .................... | 705/67 |
| 2003/0174861 | A1 * | 9/2003 | Levy et al. .................... | 382/100 |
| 2007/0250716 | A1 * | 10/2007 | Brunk et al. .................. | 713/176 |
| 2007/0266252 | A1 * | 11/2007 | Davis et al. ................... | 713/176 |

OTHER PUBLICATIONS

Digital signature protection of the OSPF routing protocol, by Murphy, S.L. and Badger, M.R. Publication Date: Feb. 22-23, 1996, ISBN: 0-8186-7222-6.*

* cited by examiner

*Primary Examiner* — Farid Homayounmehr
(74) *Attorney, Agent, or Firm* — Oblon, Spivak, McClelland, Maier & Neustadt, L.L.P.

(57) ABSTRACT

Information capable of tracing a content distribution route, such as a user ID of a content destination, a content ID, a content provider ID, and a service provider ID, is superimposed on the content as additional information for digital watermarking or steganography before delivering the content. For example, the content ID and the user ID are detected from the delivered content. When both the content ID and the user ID are not detected from the content, it is determined that the content is illegally distributed, and the content distribution route is traced to identify the source of the illegally distributed content. In most cases, unique information, such as a user ID, still remains in copies of the content, thus effectively preventing illegal distribution of the content.

20 Claims, 15 Drawing Sheets

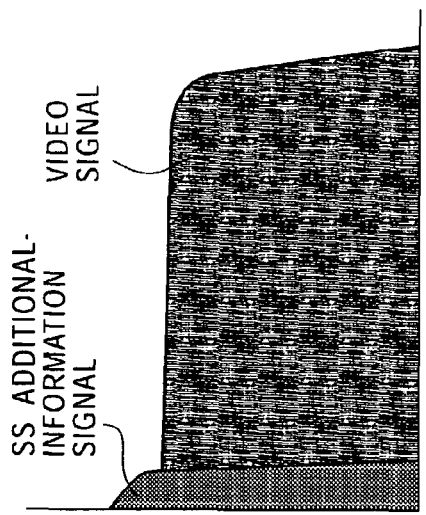
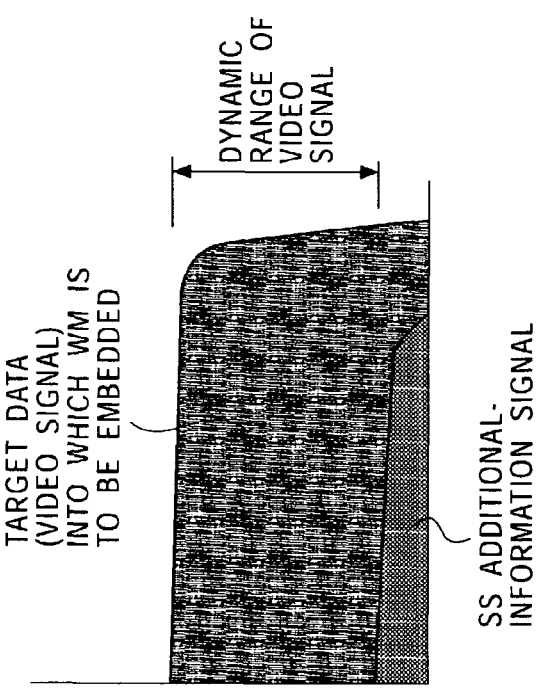
FIG. 6A
FIG. 6B
FIG. 6C
FIG. 6D

FIG. 11

| CONTENT ID | FIRST SERVICE PROVIDER ID | SECOND SERVICE PROVIDER ID | ... | USER ID |
|---|---|---|---|---|
| CAB2334567 | SPO231267 | SP9765476 | ... | US3372395 |
| CCS463869 | SP1372988 | SP6454305 | ... | US876430 |
| .. | .. | .. | ... | .. |
| CYT9453987 | SP0872346 | SP7650986 | ... | US869743 |

ADDITIONAL-INFORMATION DETECTION PROCESSING APPARATUS AND METHOD, CONTENT PLAYBACK PROCESSING APPARATUS AND METHOD, AND COMPUTER PROGRAM

BACKGROUND OF THE INVENTION

1. Field of the Invention The present invention relates to an additional-information detection processing apparatus and method, a content playback processing apparatus and method, and a computer program. More specifically, the present invention relates to an additional-information detection processing apparatus and method, a content playback processing apparatus and method, and a computer program in which the distribution of illegal content, such as copy data of content data, can be effectively prevented.

2. Description of the Related Art

With the progress of digital technology, the dissemination of digital recording and playback apparatuses capable of recording and playing back many times without degradation in image or sound quality has increased, and a variety of digital content such as images and music can be delivered and distributed via media such as digital video tape recorders (VTRs), digital versatile discs (DVDs), and compact discs (CDs), or over networks.

In a known method, various types of information, such as content copyright information, content modification information, content configuration information, content processing information, content editing information, content playback processing schemes, and content copy control information, is embedded into the content as additional information corresponding to the content using a digital watermark (WM) technique. Digital watermarks are typically invisible or imperceptible on played back content (image data or audio data), and can be detected or embedded only by executing a specific algorithm or by a specific device. Content is processed in a receiver, a recording and playback apparatus, or the like to detect a digital watermark to control the content according to the digital watermark, thus achieving highly reliable control.

A variety of methods of embedding and detecting digital watermarks in and from data have been proposed. A typical method of embedding and detecting digital watermarks is based on the statistical characteristics of original signal data such as an image. A description is now given of a method of embedding a digital watermark as a basic pattern of random-number data of a PN (pseudo-noise) sequence based on the statistical characteristics of an image signal such as a digital video signal. For simplification, it is assumed herein that frame data of a luminance signal has eight horizontal pixels by six vertical pixels.

First, PN-sequence random-number data PN is defined as follows:

$$PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & +1 & +1 & -1 & +1 \\ +1 & -1 & -1 & -1 & +1 & +1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad \text{Eq. (1)}$$

The random-number data PN is generated so that the sum is statistically zero. Then, embedded information DC is spread by the random-number data PN having characteristics indicated by the above equation. When the polarity of the embedded information DC is expressed by "1", the pattern of the random-number data PN is used without change. Then, the digital watermark pattern WM is expressed as follows:

$$WM = PN = \begin{pmatrix} +1 & -1 & +1 & +1 & -1 & +1 & -1 & -1 \\ +1 & +1 & -1 & -1 & -1 & +1 & -1 & +1 \\ -1 & +1 & +1 & -1 & +1 & +1 & -1 & +1 \\ +1 & -1 & -1 & -1 & +1 & +1 & -1 & -1 \\ -1 & -1 & +1 & +1 & +1 & -1 & -1 & +1 \\ +1 & +1 & -1 & +1 & -1 & -1 & +1 & -1 \end{pmatrix} \quad \text{Eq. (2)}$$

When the polarity of the embedded information DC is expressed by "0", the inverse pattern of the random-number data PN is used. That is, the digital watermark pattern WM is expressed as follows:

$$WM = -PN = \begin{pmatrix} -1 & +1 & -1 & -1 & +1 & -1 & +1 & +1 \\ -1 & -1 & +1 & +1 & +1 & -1 & +1 & -1 \\ +1 & -1 & -1 & +1 & -1 & -1 & +1 & -1 \\ -1 & +1 & +1 & +1 & -1 & -1 & +1 & +1 \\ +1 & +1 & -1 & -1 & -1 & +1 & +1 & -1 \\ -1 & -1 & +1 & -1 & +1 & +1 & -1 & +1 \end{pmatrix} \quad \text{Eq. (3)}$$

If the embedded information DC is formed of a plurality of information bits, the frame data of the luminance signal may be divided into appropriate small regions so that each of the information bits is made to correspond with each of the regions. Alternatively, for example, a plurality of different orthogonal digital watermark patterns may be used so that each of the information bits is made to correspond with each of the digital watermark patterns. A combination of these methods may also be used.

In an image signal such as a digital video signal, it is assumed that frame data DV1 indicating a luminance signal pixel value of certain frame data is expressed as follows:

$$DV1 = \begin{pmatrix} 50 & 51 & 52 & 54 & 52 & 52 & 50 & 49 \\ 49 & 50 & 51 & 53 & 54 & 53 & 50 & 50 \\ 48 & 50 & 50 & 50 & 51 & 52 & 49 & 48 \\ 49 & 49 & 50 & 48 & 49 & 50 & 50 & 49 \\ 48 & 48 & 50 & 49 & 47 & 50 & 52 & 50 \\ 49 & 50 & 52 & 51 & 51 & 52 & 55 & 53 \end{pmatrix} \quad \text{Eq. (4)}$$

Since image signal such as digital video signals have a characteristic that adjacent luminance signals have almost the same pixel values, the values of adjacent pixels are set herein to approximately equal values.

The digital watermark is embedded by adding the digital watermark pattern WM to the frame data DV1 of the luminance signal. When the polarity of the embedded information DC is expressed by "1", the digital watermark pattern WM expressed by Eq. (2) is added to the luminance signal expressed by Eq. (4), and frame data DV2 of the digital-watermarked luminance signal is expressed as follows:

$$DV2 = DV1 + WM = \begin{pmatrix} 51 & 50 & 53 & 55 & 51 & 53 & 49 & 48 \\ 50 & 51 & 50 & 52 & 53 & 54 & 49 & 51 \\ 47 & 51 & 51 & 49 & 52 & 53 & 48 & 49 \\ 50 & 48 & 49 & 47 & 50 & 51 & 49 & 48 \\ 47 & 47 & 51 & 50 & 48 & 49 & 51 & 51 \\ 50 & 51 & 51 & 52 & 50 & 51 & 56 & 52 \end{pmatrix} \quad \text{Eq. (5)}$$

In order to detect the embedded information DC from the frame data DV2 of the digital-watermarked luminance signal, the same PN-sequence random-number data PN used for embedding the information is used. The inner product P1 of the frame data DV1 of the original luminance signal and the random-number data PN is given by the following equation:

$$P1 = DV1 \cdot PN = 1 \quad \text{Eq. (6)}$$

With the statistical characteristics of the image signal, the inner product P1 has a value close to zero. On the other hand, the inner product P2 of the frame data DV2 of the digital-watermarked luminance signal and the random-number data PN is given by the following equation when the polarity of the embedded information DC is expressed by "1":

$$\begin{aligned} P2 &= DV2 \cdot PN \\ &= (DV1 + WM) \cdot PN \\ &= (DV1 + PN) \cdot PN \\ &= P1 + PN^2 \\ &= 1 + 48 \end{aligned} \quad \text{Eq. (7)}$$

When the polarity of the embedded information DC is expressed by "0", the inner product P2 is given by the following equation:

$$\begin{aligned} P2 &= DV2 \cdot PN \\ &= (DV1 + WM) \cdot PN \\ &= (DV1 - PN) \cdot PN \\ &= P1 - PN^2 \\ &= 1 - 48 \end{aligned} \quad \text{Eq. (8)}$$

In this case, the absolute value of the inner product P2 is close to the inner product $PN^2$ of the random-number data PN by itself. When the inner product P1 of the frame data DV1 of the original luminance signal and the random-number data PN, and the inner product P2 of the frame data DV2 of the digital-watermarked luminance signal and the random-number data PN are calculated with respect to various images, the distribution of the inner products P1 and P2 can be expressed using a probability density function shown in FIG. 15. A certain nonnegative threshold TH is set so as to discriminate portions with and without digital watermarks and to determine the polarity as follows:

| | |
|---|---|
| $P2 \leq -TH$: | watermarked portion (polarity: 0) |
| $\|P2\| < TH$: | unwatermarked portion |
| $P2 \geq TH$: | watermarked portion (polarity: 1) |
| | ... Ex. (9) |

Accordingly, the embedded information DC can be detected from the frame data DV2 of the digital-watermarked luminance signal.

In practice, important points of digital watermarking are the reliability of digital watermark detection and the influence of digital watermarks on the image quality. In order to correctly discriminate portions with and without digital watermarks, it is necessary to define the threshold TH so that, in FIG. 15, the probability density function can be accurately separated into the "watermarked" portions and the "unwatermarked" portion. Actually, however, troughs overlap in the probability density function, and it is difficult to select the threshold TH so as to correctly discriminate portions with and without digital watermarks. The probability that an unwatermarked portion will be considered as a "watermarked" portion is referred to as "false positive". An extremely small false positive value is required for ensuring secure distribution of content. In order to increase the reliability of digital watermark detection, therefore, the digital watermark embedding strength should be increased using a nonnegative scalar quantity C. Frame data DV2 of a luminance signal into which the digital watermark is embedded using the scalar quantity C with a large digital watermark embedding strength is given by the following equation:

$$DV2 = DV1 + CWM \quad \text{Eq. (10)}$$

The inner product P2 of the frame data DV2 of the digital-watermarked luminance signal and the random-number data PN should be much larger. More specifically, the frame data DV2 is given by the following equation:

$$\begin{aligned} P2 &= DV2 \cdot PN \\ &= (DV1 + CWM) \cdot PN \\ &= (DV1 \pm PN) \cdot PN \\ &= P1 \pm CPN^2 \end{aligned} \quad \text{Eq. (11)}$$

However, in the case where the digital watermark embedding strength is increased in this way, the influence of the digital watermark on the image quality is not negligible. There is a tradeoff between the reliability of digital watermark detection and the influence of the digital watermark on the image quality.

Techniques which effectively use human visual characteristics to embed a digital watermark have been proposed in order to reduce the influence of digital watermarks on the image quality as much as possible while maintaining high reliability of digital watermark detection. In such techniques, in view of the human visual characteristics, digital watermark patterns are reallocated in an image, or digital watermark patterns are matched with the motion of an image, thus effectively reducing the influence of the digital watermark on the image quality without changing the overall embedding strength. The human eye is sensitive to changes in low-frequency regions such as flat portions, but is insensitive to changes in high-frequency regions such as edge portions. By making use of this characteristic, digital watermark patterns are reallocated to imperceptible edge portions from perceptible flat portions, thus reducing the influence of the digital watermark on the image quality while maintaining high reliability of digital watermark detection. The digital watermark patterns are stationary in a still image, and the digital watermark patterns move together with moving images, thus achieving embedding of the digital watermark in a manner imperceptible to the human eye.

Techniques of directly superimposing additional information on an original information signal of image data, audio data, and so on, such as digital watermarking, provide a strong resistance to tampering. Such techniques are therefore expected to be secure information adding approaches.

In one specific digital watermarking method, for example, information such as a content ID for identifying content to be delivered on a network, or a user ID for identifying a user to which the content is directed is added to the content using digital watermarking before delivering the digitally watermarked content.

However, there has been a problem that, when the same content is assigned with different IDs for different users, a coalition of users can detect the IDs from the differences between a plurality of pieces of content and can perform signal processing to delete the IDs from the content so as to make the identification information undetectable, resulting in unauthorized secondary distribution of the content with the user IDs removed therefrom. In this situation, if content containing no ID originally is concurrently distributed, it is very difficult to identify tampered content.

If there are users having such tampered content, it is also difficult to identify the tamperer only by analyzing the content. In a case where content to be protected is illegally distributed, illegal-content searching such as content distribution route tracing or source finding is almost impossible, thus making it difficult to prove the illegality. Therefore, it is difficult to take appropriate action against tampered content.

SUMMARY OF THE INVENTION

Accordingly, in view of the aforementioned problems with the related art, it is an object of the present invention to provide an additional-information detection processing apparatus and method, a content playback processing apparatus and method, and a computer program in which the source of illegal signal processing performed on content in which additional information such as a digital watermark is embedded or illegal signal processing performed on the additional information can be easily identified, thereby effectively preventing illegal content distribution.

In one aspect of the present invention, an additional-information detection processing apparatus for detecting additional information from content having the additional information superimposed thereon to detect whether or the content is illegal includes an additional-information detector for receiving the content and for detecting first additional information, which includes content routing information; a delivery record table in which content routing information of the content is recorded; and a data verifier for comparing and verifying the first additional information detected by the additional-information detector with the content routing information recorded in the delivery record table. Based on a data verification result obtained by the data verifier, the illegality of the content is detected.

The additional information may be digital watermark information, and the additional-information detector may detect the digital watermark information.

The first additional information may include identification information (user ID) of a user who receives the content.

The first additional information may include content identification information (content ID) unique to the content.

The first additional information may include service provider identification information (service provider ID) unique to a service provider, which is an entity handling content, delivery, or distribution.

The delivery record table may include a correspondence between a content identifier, an identifier of a user who receives the content, and an identifier of a service provider, which is an entity handling content, delivery, or distribution.

The additional information may be steganography information, and the additional-information detector may detect the steganography information.

In a second aspect of the present invention, an additional-information detection processing apparatus for detecting additional information from content having the additional information embedded therein in advance to detect whether or not the content is illegal includes a receiver for receiving the content; a first detector for detecting from the content a content ID for identifying the content; a second detector for detecting from the content a user ID for identifying a user of the content; and a reporting unit for determining that the content is illegal when only one of the content ID and the user ID is detected, and for reporting the illegality of the content.

The additional-information detection processing apparatus may further include a content delivery record table in which content routing information is recorded; and a data verifier for comparing and verifying the content ID detected by the first detector and the user ID detected by the second detector with the content routing information recorded in the content delivery record table. The reporting unit may report the determination that the content is illegal based on a data verification result of the data verifier.

The content delivery record table may include a correspondence between a content identifier, an identifier of a user who receives the content, and an identifier of a service provider, which is an entity handling content, delivery, or distribution.

In a third aspect of the present invention, a content playback processing apparatus for playing back content includes an additional-information detector for receiving content having additional information superimposed thereon and for detecting a user identifier (ID) which is contained in the additional information; a memory for storing a user identifier (ID); a comparator/verifier for comparing and verifying the user ID detected from the content with the user ID stored in the memory; and a playback controller for playing back the content on the condition that the comparator/verifier determines that both user TDs are verified with each other.

In a fourth aspect of the present invention, an additional-information detection processing method for detecting additional information from content having the additional information superimposed thereon to detect whether or not the content is illegal includes an additional-information detecting step of receiving the content and detecting first additional information, which includes content routing information; and a data verifying step of comparing and verifying the detected first additional information with content routing information of the content, which is recorded in a delivery record table. Based on a data verification result obtained in the data verifying step, the illegality of the content is detected.

The additional information may be digital watermark information, and, in the additional-information detecting step, the digital watermark information may be detected.

The first additional information may include identification information (user ID) of a user who receives the content.

The first additional information may include content identification information (content ID) unique to the content.

The first additional information may include service provider identification information (service provider ID) unique to a service provider, which is an entity handling content, delivery, or distribution.

The delivery record table may include a correspondence between a content identifier, an identifier of a user who receives the content, and an identifier of a service provider, which is an entity handling content, delivery, or distribution.

The additional information may be steganography information, and, in the additional-information detecting step, the steganography information may be detected.

In a fifth aspect of the present invention, an additional-information detection processing method for detecting additional information from content having the additional information embedded therein in advance to detect whether or not the content is illegal includes a content receiving step of receiving the content; a first detecting step of detecting from the content a content ID for identifying the content; a second detecting step of detecting from the content a user ID for identifying a user of the content; and a reporting step of determining that the content is illegal when only one of the content ID and the user ID is detected, and reporting the illegality of the content.

The additional-information detection processing method may further include a data verifying step of comparing and verifying the content ID detected in the first detecting step and the user ID detected in the second detecting step with content routing information recorded in a content delivery record table. In the reporting step, based on a data verification result obtained in the data verifying step, the determination that the content is illegal may be reported.

The content delivery record table may include a correspondence between a content identifier, an identifier of a user who receives the content, and an identifier of a service provider, which is an entity handling content, delivery, or distribution.

In a sixth aspect of the present invention, a content playback processing method for playing back content includes an additional-information detecting step of receiving content having additional information superimposed thereon and detecting a user identifier (ID) which is contained in the additional information; a comparing and verifying step of comparing and verifying the user ID detected from the content with a user identifier (ID) read from a memory; and a playback control step of playing back the content on the condition that it is determined in the comparing and verifying step that both user IDs are verified with each other.

In a seventh aspect of the present invention, a computer program for executing an additional-information detecting process for detecting additional information from content having the additional information superimposed thereon to detect whether or not the content is illegal includes an additional-information detecting step of receiving the content and detecting firs additional information, which includes content routing information; and a data verifying step of comparing and verifying the first additional information detected in the additional-information detecting step with content routing information of the content, which is recorded in a content delivery record table.

In an eighth aspect of the present invention, a computer program for executing a process for detecting additional information from content having the additional information embedded therein in advance to detect whether or not the content is illegal includes a content receiving step of receiving the content; a first detecting step of detecting from the content a content ID for identifying the content; a second detecting step of detecting from the content a user ID for identifying a user of the content; and a reporting step of determining that the content is illegal when only one of the content ID and the user ID is detected, and reporting the illegality of the content.

In a ninth aspect of the present invention, a computer program for executing a content playback process includes an additional-information detecting step of receiving content having additional information superimposed thereon and detecting a user identifier (ID) which is contained in the additional information; a comparing and verifying step of comparing and verifying the user ID detected from the content with a user identifier (ID) read from a memory; and a playback control step of playing back the content on the condition that it is determined in the comparing and verifying step that the user IDs are verified.

According to the present invention, therefore, information capable of tracing a content distribution route, such as a user ID of a content destination, a content ID, a content provider ID, and a service provider ID, is superimposed on the content as additional information for digital watermarking, steganography, or the like. For example, the content ID and the user ID are detected. When at least one of the content ID and the user ID is not detected, it is determined that the content is illegal. If the content is illegally distributed, the content distribution route can be traced to identify the source of the illegally distributed content based on the additional information detected from the content.

According to the present invention, furthermore, a plurality of types of information capable of tracing a content distribution route, such as a user ID of a content destination, a content ID, a content provider ID, and a service provider ID, are superimposed on the content. If someone desires to delete digital watermarks without authorization, for example, if he/she collects a large amount of content image data in order to remove common additional information, it is difficult to remove additional information, such as a user ID, different for different pieces of content. Since unique information such as a user ID still remains in copies of the content, illegal distribution of the content can be effectively prevented.

According to the present invention, furthermore, content is played back only when the user ID stored in a memory of a playback apparatus and the user ID added to the content are verified with each other. Therefore, playback of the content is permitted only on an authorized user's device which has received the legally delivered content, while, for example, playback of a copy of the content would not be permitted on another user's device, thus preventing illegal use of the content.

The computer program according to the present invention may be offered by storage media for loading it in the computer-readable form to, for example, a general-purpose computer system capable of executing various program codes, such as recording media including CDs, FDs, and MO (magneto-optical) discs, or via communication media such as networks. Since the program is offered in the computer-readable form, processing for the program can be performed on the computer system.

Other objects, features, and advantages of the present invention will become apparent from the following embodiments of the present invention and the accompanying drawings. As used herein, the term "system" represents a logical group of apparatuses, and is not limited to one in which apparatuses with different structures are accommodated in the same case.

BRIEF DESCRIPTION OF THE DRAWINGS

FIGS. 6A through 6D are spectra showing spread spectrum modulation in an additional information superimposing process;

FIG. 11 is a view showing an exemplary delivery record table of the additional-information detection processing apparatus of the present invention;

DESCRIPTION OF THE PREFERRED EMBODIMENTS

The details of an additional-information detection processing apparatus and method, and a content playback processing apparatus and method according to the present invention are described below with reference to the drawings.

Additional Information

Figure 1A:
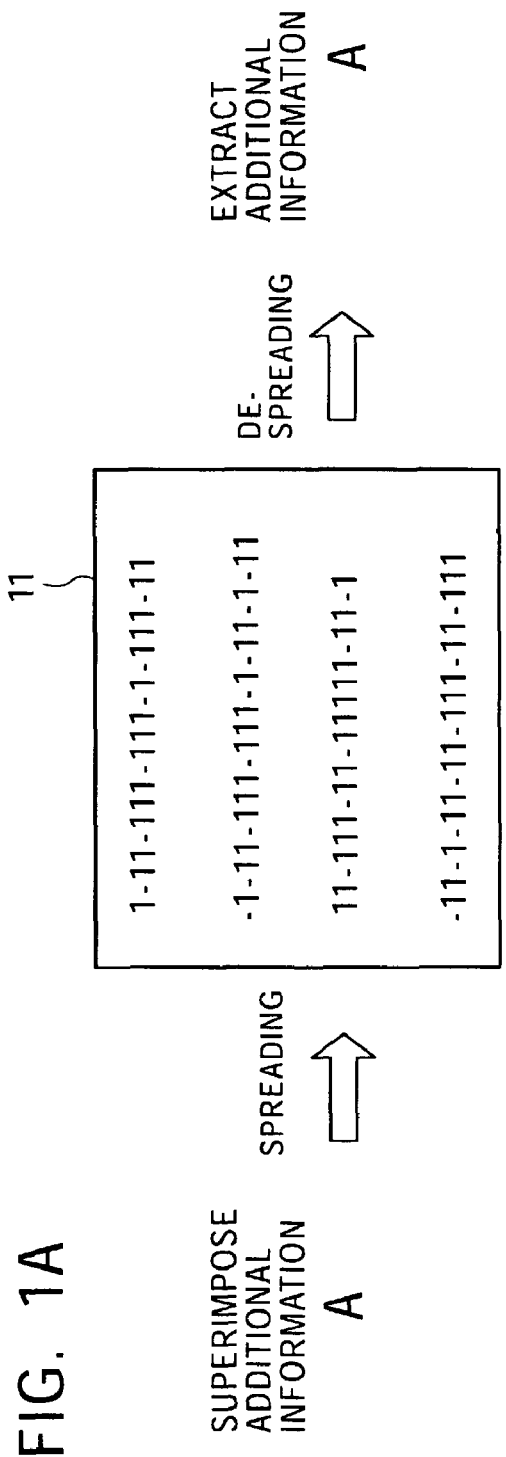
FIGS. 1A and 1B are schematic diagrams showing digital watermarking and steganography techniques, respectively.

First, a brief description is given of additional information to be added to various types of information such as images and sounds according to the present invention. A typical example of the additional information is a digital watermark (WM), as described above. As shown in FIG. 1A, for example, when information A is embedded as a digital watermark into an image 11, as described above in the Description of the Related Art, the embedded information A is spread by random-number data PN to generate a digital watermark pattern given by Eq. (3) of the Description of the Related Art, and this pattern is embedded into the image 11, as indicated by a pattern of the image 11 shown in FIG. 1A.

When the digital watermark is detected from the digital watermarked image, the same PN-sequence random-number data PN used for embedding the digital watermark is used for de-spreading. In the de-spreading operation, the inner product P1 of frame data DV1 of the original luminance signal and the random-number data PN, and the inner product P2 of frame data DV2 of the digital-watermarked luminance signal and the random-number data PN are calculated to express the distribution of the inner products P1 and P2 using a probability density function (see FIG. 15), and a certain threshold TH is set so as to detect the embedded digital watermark information.

As described above, the digital watermark may be undetectable in some cases, for example, when digital-watermarked image data has been encoded, such as affine-transformed. It is also difficult to detect the digital watermark from the re-captured version of the image data.

Another type of additional information different from the above-described digital watermark information to be embedded is used as steganography information. Steganography is a technique for hiding additional information in images, and includes a number of methods of directly superimposing a message forming additional information on an image or the like, such as a method in which data is inserted into the least significant bit of bit information indicating each pixel value of the image information, invisible inks, microdots, character rearrangement, and spread-spectrum (SS) communications.

Figure 1B:
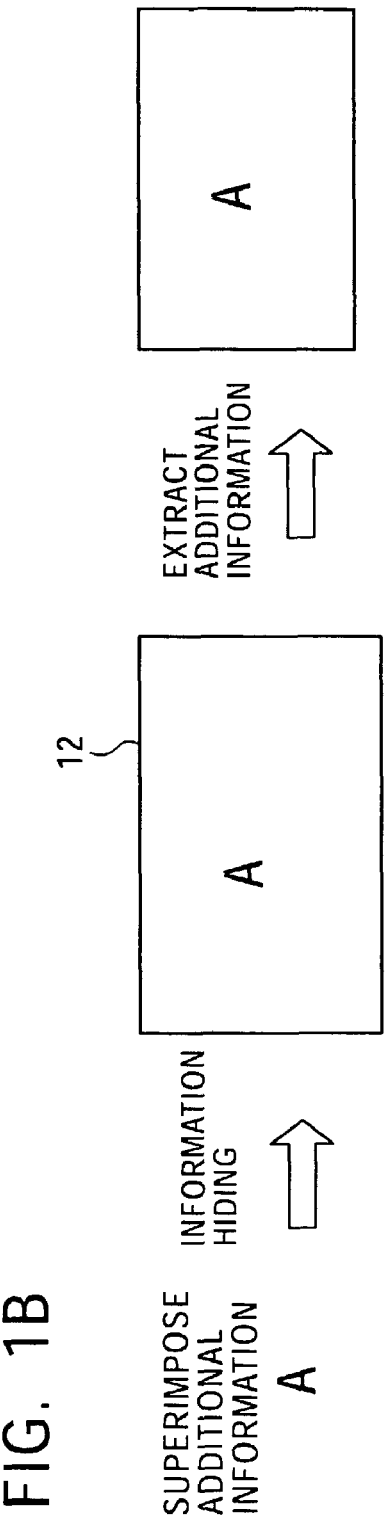

As shown in FIG. 1B, when character information A is embedded into an image 12, for example, bit information of pixels of only portions that constitute character "A" is modified in the image 12. For example, the value of pixels of the portions that constitute the character is modified to the current pixel value plus one. This process is performed on, for example, consecutive frames of a motion image so that the consecutive frames are subjected to integration and normalization to extract the added information A.

In a content playback processing apparatus and method, an additional-information superimposing apparatus and method, and an additional-information detection processing apparatus and method of the present invention, additional information for both digital watermarking and steganography is applicable.

Additional Information Superimposing Process

Figure 2:
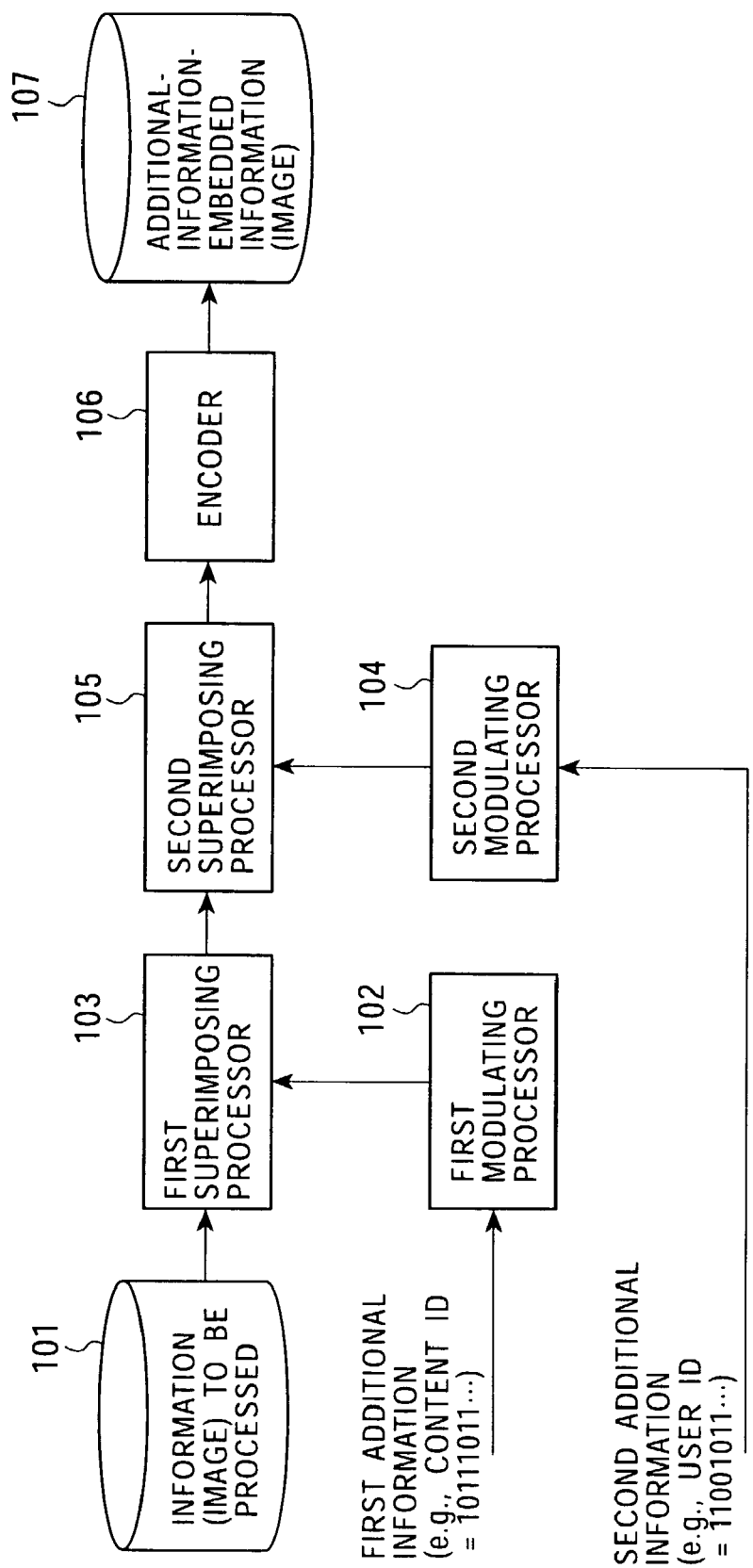
FIG. 2 is a block diagram of an additional-information superimposing apparatus for embedding additional information according to the present invention.

FIG. 2 illustrates an additional-information superimposing apparatus for embedding additional information according to the present invention. As shown in FIG. 2, the additional-information superimposing apparatus includes a first modulating processor 102, a first superimposing processor 103, a second modulating processor 104, a second superimposing processor 105, and an encoder 106. The additional-information superimposing apparatus superimposes additional information for digital watermarking, steganography, or the like on various original data such as images input from information to be processed (hereinafter referred to as "processed information") 101.

It is assumed herein that a plurality of types of additional information are superimposed. Although the additional-information superimposing apparatus shown in FIG. 2 includes two superimposing processors for superimposing two types of additional information, three or more types of additional information may be superimposed. The plurality of types of additional information include, for example, a content identifier (content ID), a user identifier (user ID), and a service provider identifier (SP-ID).

In the system of the present invention, for example, content routing information is superimposed as additional information such as a digital watermark on the content.

Figure 3:
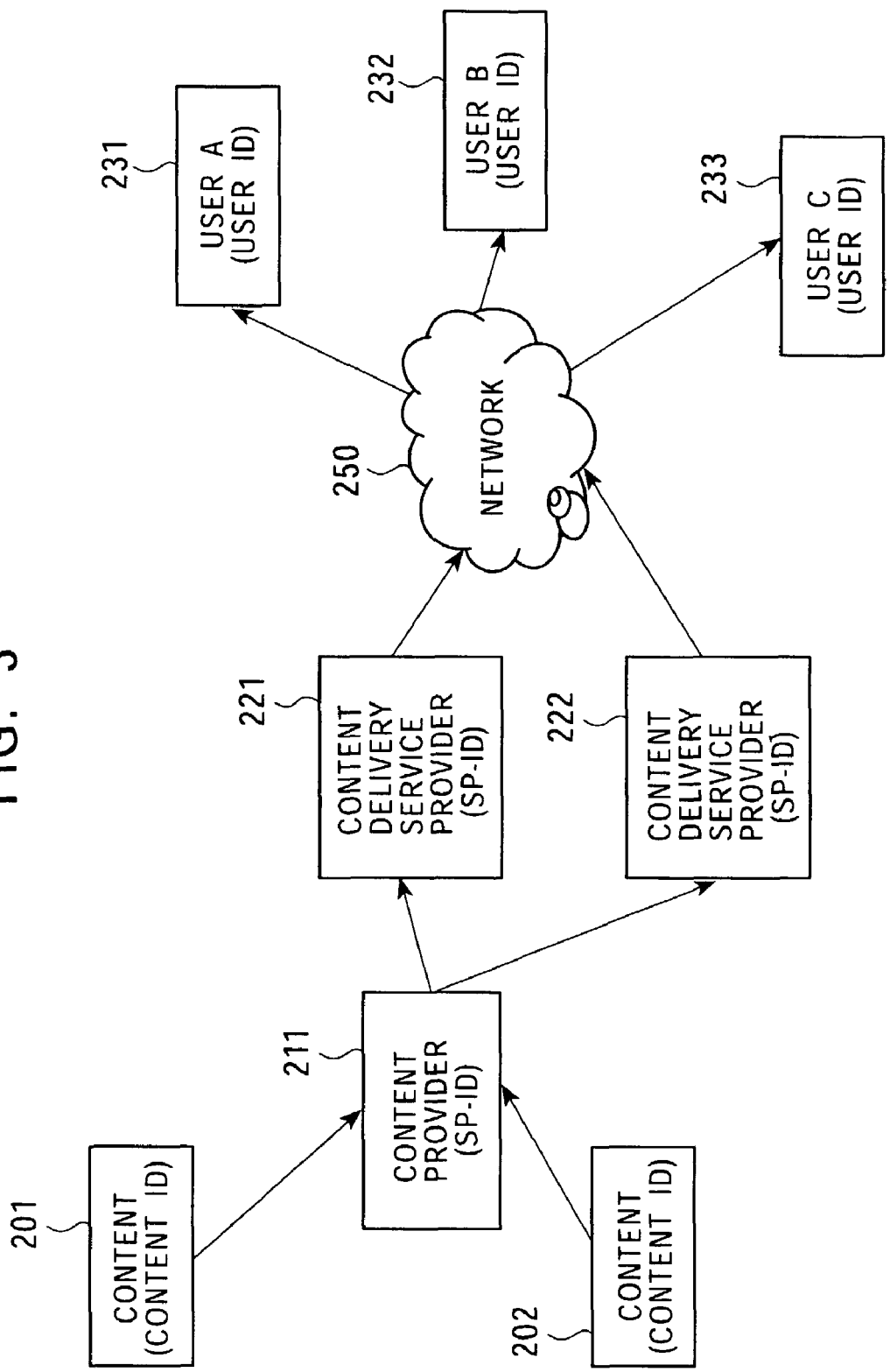
FIG. 3 is a block diagram of a content delivery system of the present invention.

Specifically, content distribution over a network shown in FIG. 3 is assumed. For example, when content 201 is delivered to a user A 231 via a content provider 211 and a content delivery service provider 221 over a network 250, desirably, a content identifier or content ID of the content 201, a service provider ID of the content provider 211, a service provider ID of the content delivery service provider 221, and a user ID of the user A 231 are all added to the content. Alternatively, an identifier of an entity selected from a plurality of entities in this content distribution route is added to the content.

In this example, the content delivery service provider 221 adds to the content additional information corresponding to a content ID of the delivered content and a user ID of a user to which the content is delivered.

That is, the additional-information superimposing apparatus shown in FIG. 2 is incorporated in the content delivery service provider 221, and the content delivery service provider 221 adds the content ID and the user ID to the content to be delivered.

This is merely an example, and, for example, both the content delivery service provider 221 and the content provider 211 may include the additional-information superimposing apparatus, so that the content ID and the user ID are added to the content by the content provider 211 and the content delivery service provider 221, respectively.

The processed information 101 includes various data such as images, audio data, and program data into which additional information is to be embedded, including, for example, data read from storage media such as hard disks and DVDs, and images supplied from image capturing devices such as scanners and digital cameras.

In the following description, additional information is superimposed on image data, by way of example. However, the present invention is not limited to image data, and is generally applicable to various information signals such as audio data and other program information.

Figure 4:
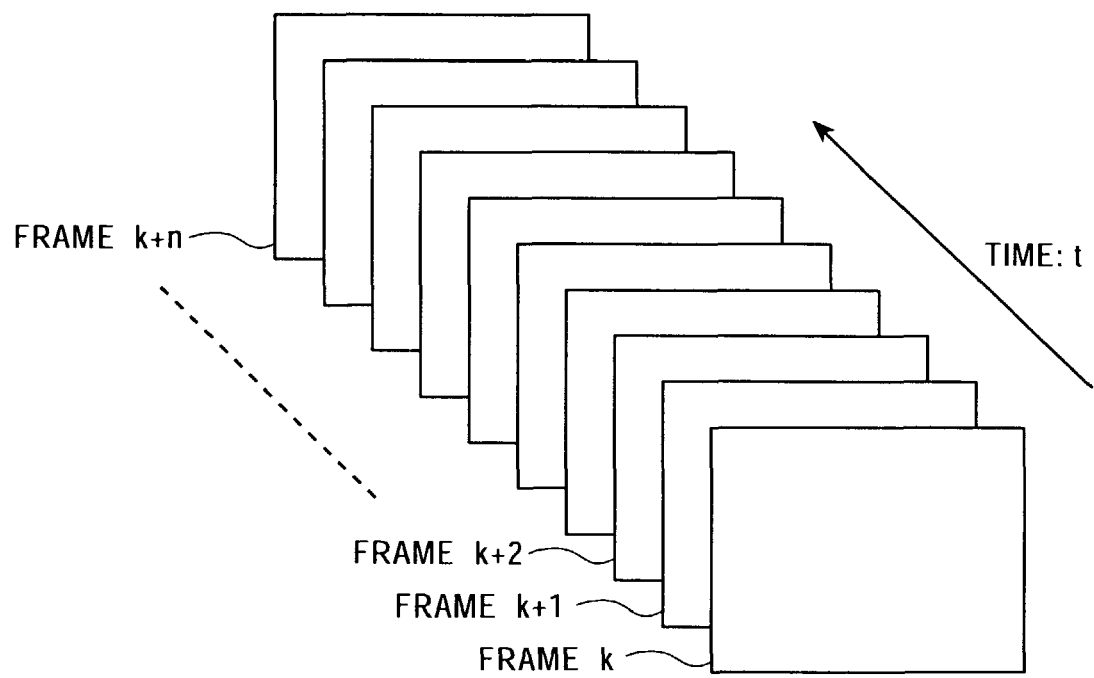
FIG. 4 is a view showing the structure of motion-image data to be processed in an additional-information detecting process of the present invention.

When additional information is superimposed on a motion image, the additional-information superimposing process is performed on every frame image. FIG. 4 illustrates a frame structure of a motion image. As shown in FIG. 4, when frame data forming the motion image includes a sequence of frames k to k+n along a time axis t, the data is processed in turn, starting from the frame k.

In the structure shown in FIG. 2, it is assumed that first additional information indicates a content ID and second additional information indicates a user ID. For example, the first additional information and the second additional information are added as digital watermark or steganography information. In the following description, both the first additional information and the second additional information are added as digital watermark information, by way of example.

In the first modulating processor 102, digital watermark (WM) information corresponding to the content ID is modulated. The first modulating processor 102 performs a modulation process to embed the additional information into data, that is, to embed a digital watermark corresponding to bit information of the content ID into an image. The modulation process includes, for example, spread spectrum modulation, patchwork, and so on.

The spread spectrum modulation is now described.

Figure 5:
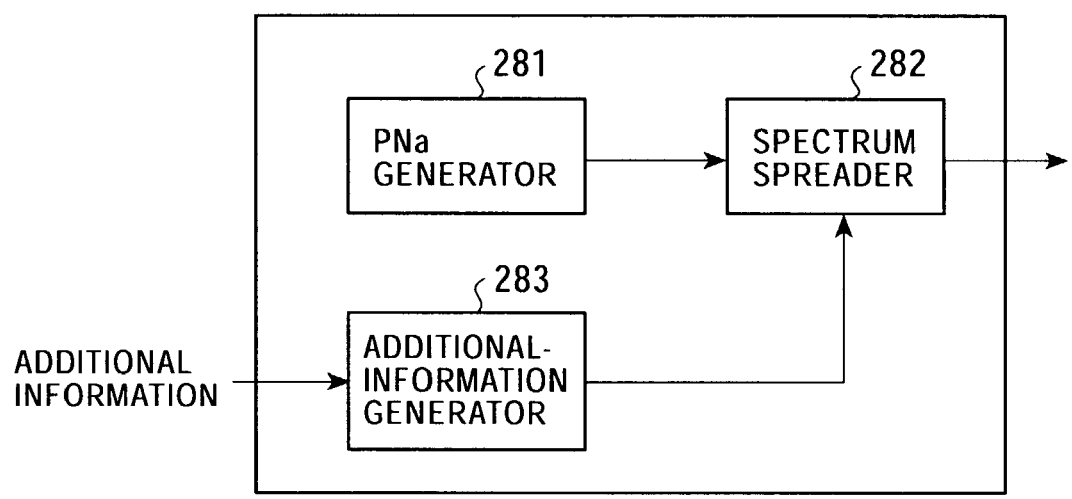
FIG. 5 is a block diagram showing in detail a modulating processor of the additional-information superimposing apparatus.

FIG. 5 is a block diagram of a spectrum spreading processor in the first modulating processor 102. In FIG. 5, a PNa generator 281 generates a PN code string PNa, and supplies the PN code string PNa to a spectrum spreader 282.

An additional-information generator 283 generates additional information (data string based on a content ID) to be superimposed as digital watermark information, and supplies the additional information to the spreader 282. The spreader 282 multiplies the additional information by the PN code string PNa to generate a spread spectrum signal. The spread spectrum signal is then output to a digital watermark (WM) level controller.

FIGS. 6A through 6D are spectra showing the relationship between additional information to be superimposed as digital watermark information and data, such as a video signal, into which the digital watermark is to be embedded. FIG. 6A is the spectrum of the original additional-information signal, FIG. 6B is the spectrum of the spread additional-information signal, FIG. 6C is the spectrum of the video signal on which the spread additional-information signal is superimposed, and FIG. 6D is the spectrum of the de-spread signal.

The additional information is a low-bit-rate signal having a small amount of information, and is a narrow-band signal, as shown in FIG. 6A. By spreading this signal, a signal having a broader bandwidth is generated, as shown in FIG. 6B. At this time, the level of the spread spectrum signal decreases in inverse proportion to the spreading ratio of the bandwidth.

This spread spectrum signal, i.e., the SS additional information, is superimposed on target data such as a video signal, in which case, as shown in FIG. 6C, the SS additional information is superimposed at a lower level than the dynamic range of the video signal serving as the information signal. This substantially prevents degradation of the main information signal.

The signal is de-spread to detect the SS additional information. The de-spreading operation allows the SS additional information to be restored to the original narrow-band signal, as shown in FIG. 6D. Given a sufficient band spreading factor, the detection level of the de-spread additional information exceeds the information signal, and the additional information can therefore be detected.

The first superimposing processor 103 superimposes the first additional information on the processed information (image) 101.

In the second modulating processor 104, a similar process to the process performed in the first modulating processor 102 is performed on the additional information corresponding to the user ID for identifying a user to which the content is delivered, and the modulated data is superimposed by the second superimposing processor 105.

Both the content ID and the user ID typically comprise multi-bit information. The multi-bit information can be embedded into an image using digital watermarking by any of the following methods: using a plurality of digital watermark patterns, dividing the image into small regions, or using a combination thereof.

In the method of using a plurality of digital watermark patterns, the following techniques are conceivable: a technique of exclusively embedding a plurality of digital watermark patterns with different meanings into an image to represent desired information, a technique of simultaneously embedding a plurality of overlapping digital watermark patterns into an image to represent desired information using a combination of the patterns, and a technique of combining these two techniques. A process for embedding a plurality of digital watermark patterns into an original image is illustrated in FIG. 7.

Figure 7:
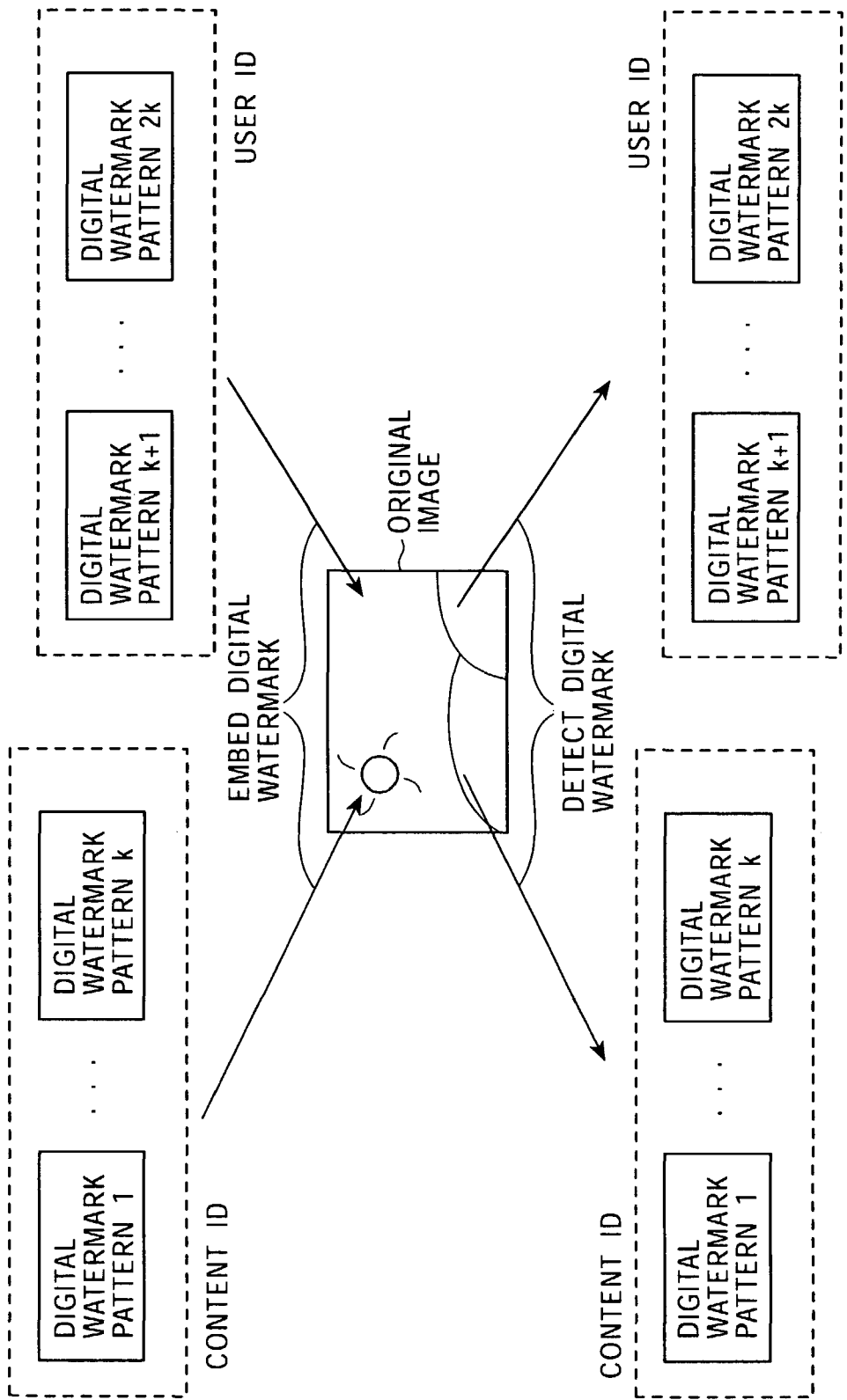
FIG. 7 is a schematic diagram showing a multi-bit information superimposing process in the additional-information superimposing process.

In the example shown in FIG. 7, each of the content ID and the user ID comprises k-bit information. A plurality of digital watermark patterns with different meanings associated with the respective bits are exclusively embedded into an image to represent desired information. In this technique, assuming that the number of bits of information to be embedded into an image is indicated by "b", then, the number of required digital watermark pattern types n is given by $n=2^b$. In the technique of simultaneously embedding a plurality of overlapping digital watermark patterns into an image to represent desired information using a combination of the patterns, on the other hand, the number of required digital watermark pattern types n is given by n=b. The latter technique requires fewer digital watermark pattern types, but often requires appropriate actions against degradation in image quality caused by embedding a plurality of overlapping digital watermark patterns into the image. Finally, the technique of combining these two techniques requires n digital watermark pattern types given by $b \leq n \leq 2^b$, and has the advantages of both techniques.

Figure 8:
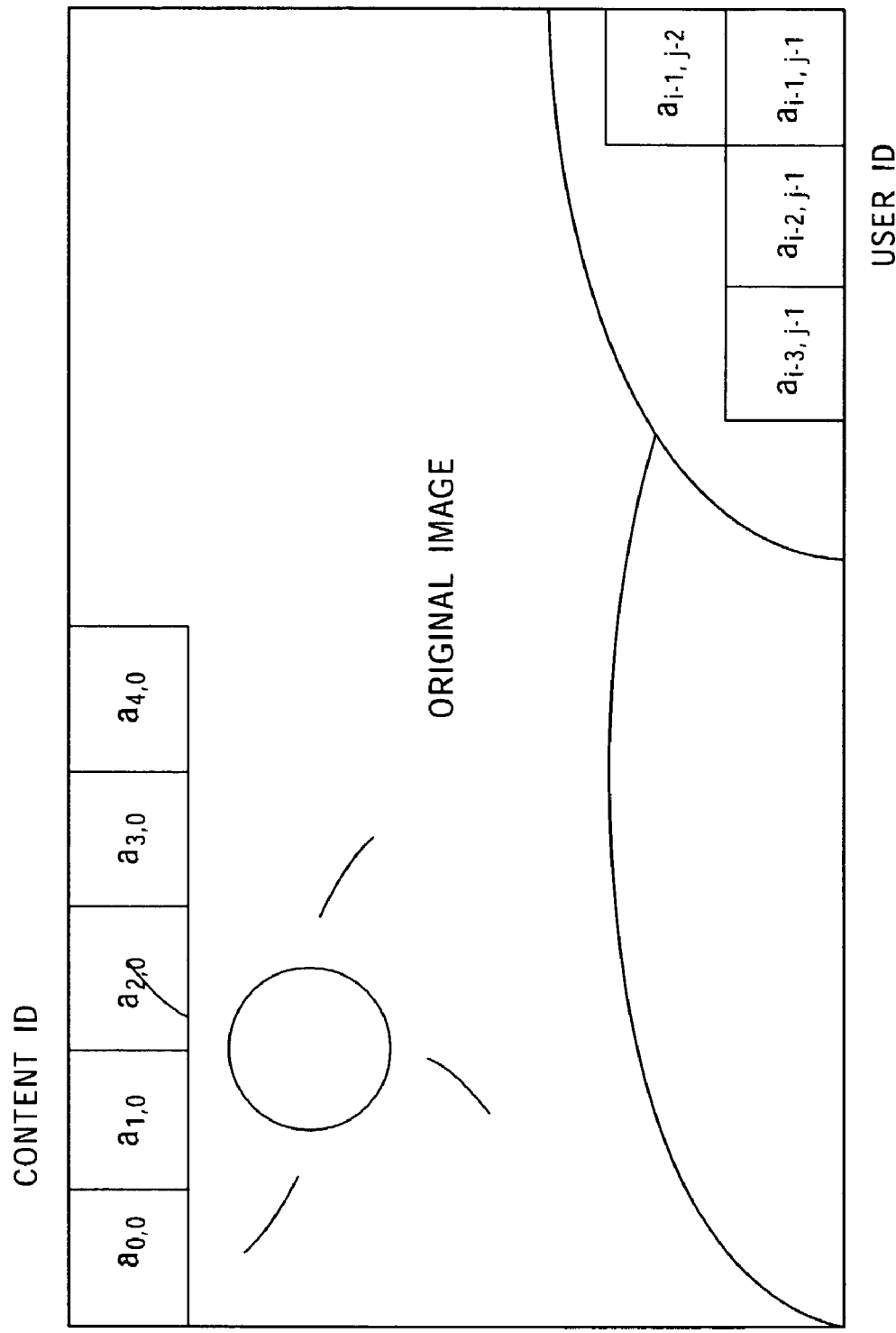
FIG. 8 is a diagram showing a multi-bit information superimposing process in the additional-information superimposing process.

The method of dividing an image into small regions is another approach of embedding multi-bit information into an image using digital watermarking. In this case, the regions are allocated different roles so that a plurality of digital watermarks can coexist in the image. For example, as shown in FIG. 8, some regions of a content image are used as regions into which the content ID is to be embedded, and other different regions are used as regions into which the user ID is to be embedded.

In this way, the first superimposing processor 103 and second superimposing processor 105 of the additional-information superimposing apparatus shown in FIG. 2 are able to superimpose different types of information so as not to make the information of one processor undetectable due to interference with the information of the other processor.

Figure 9:
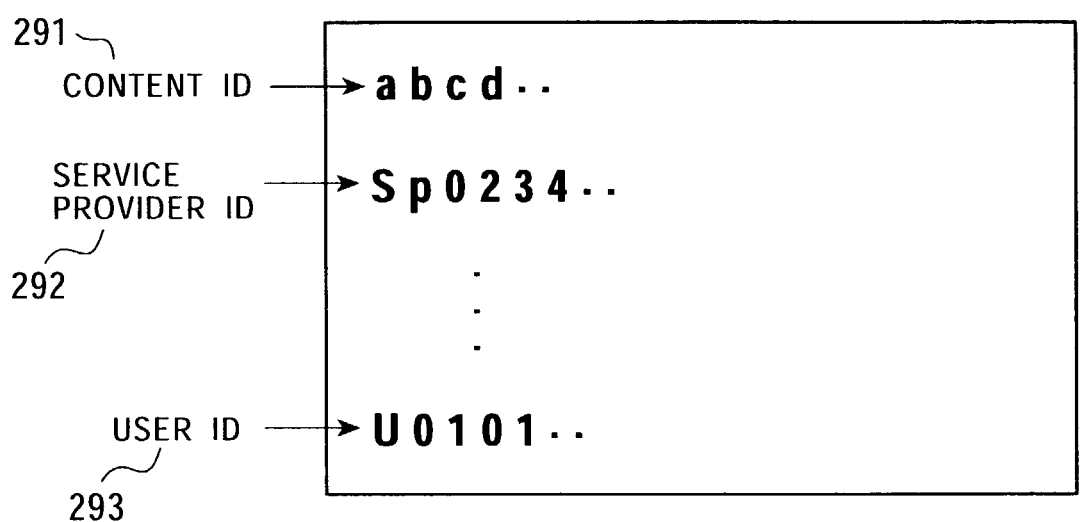
FIG. 9 is a diagram showing an example of information superimposed on the content in the additional-information superimposing process.

FIG. 9 schematically illustrates content having a plurality of types of additional information embedded therein. A content ID 291, a service provider ID 292, and a user ID 293 are embedded in the content shown in FIG. 9. In FIG. 9, the additional information is indicated as symbolic or numerical information; in practice, however, the embedded information, which is, for example, digital watermark information, allows a bit string to be detected based on the symbolic or numerical information.

The encoder 106 shown in FIG. 2 encodes the processed information (content) having a plurality of types of additional information embedded therein. This encoding process involves a data compression process for reducing the amount of data for network transfer or storage in a storage medium. The data encoded with, for example, a compression scheme such as MPEG compression, is transferred over a network as additional-information-embedded information 107 or is stored in a storage medium before being offered to a user corresponding to the user ID added to the content.

Additional Information Detecting Process

A description is now given of a process for detecting additional information from information on which the additional information is superimposed by the above-noted additional-information superimposing process.

Figure 10:
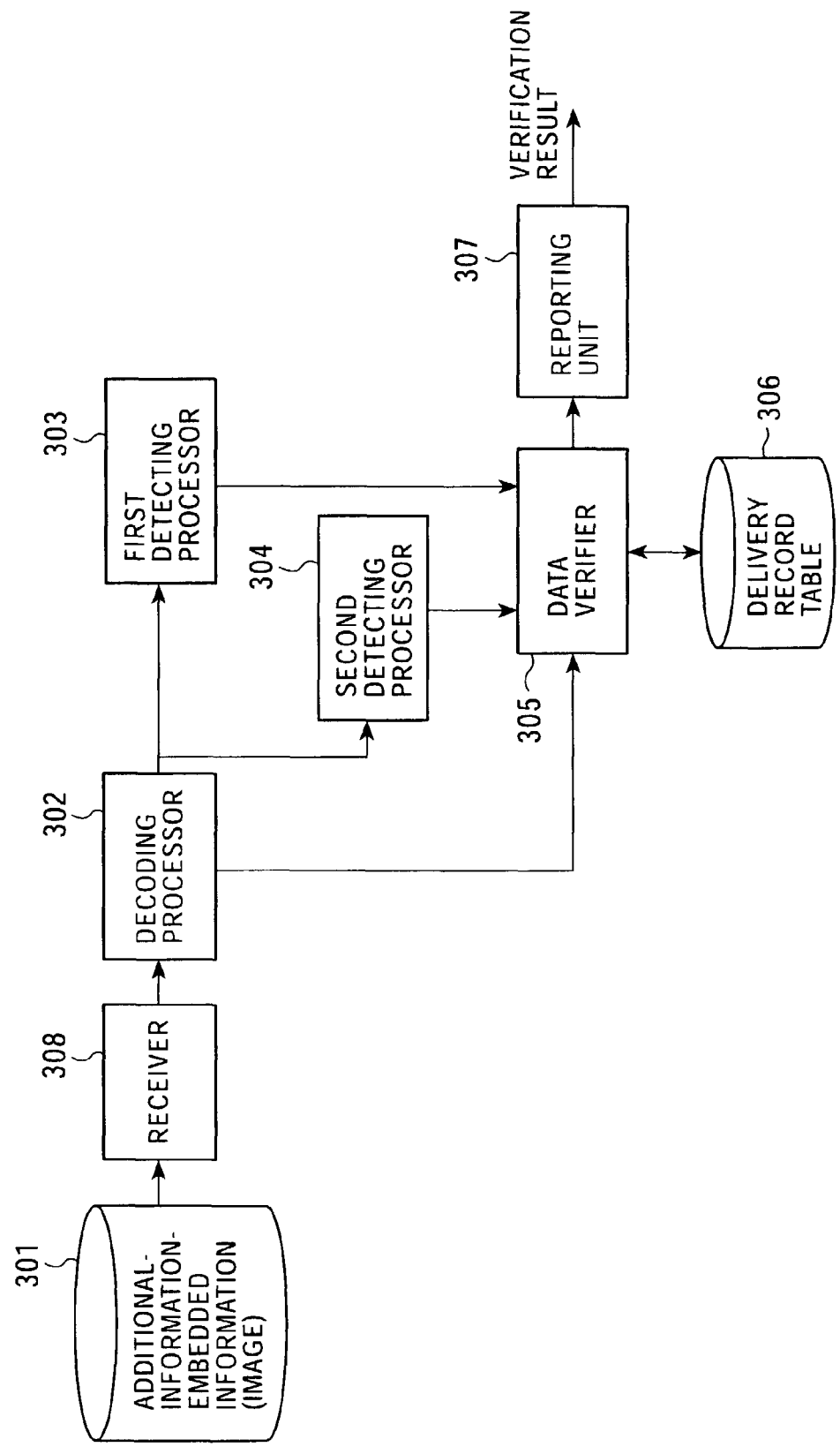
FIG. 10 is a block diagram of an additional-information detection processing apparatus of the present invention.

FIG. 10 is a block diagram of an additional-information detection processing apparatus of the present invention. The additional-information detection processing apparatus shown in FIG. 10 is a processor for detecting additional information and tracing a content distribution route.

As shown in FIG. 10, the additional-information detection processing apparatus of the present invention includes a decoding processor 302, a first detecting processor 303, a second detecting processor 304, a data verifier 305, a delivery record table 306, a reporting unit 307, and a receiver 308. Additional-information-embedded information 301, which is original information, is received by the receiver 308 to detect information such as a digital watermark.

The additional-information-embedded information 301 includes various data such as images, audio data, and program data in which additional information is embedded. The receiver 308 receives content from, for example, a network or content read from a storage medium, and outputs it to the decoding processor 302.

In the following description, additional information is detected from image data, by way of example. However, the present invention is not limited to image data, and is generally applicable to various information signals such as audio data and other program information.

When additional information is detected from a motion image, every frame image is processed. In FIG. 10, first additional information and second additional information to be detected differ from each other, and may be, for example, a content ID and a user ID, respectively.

The decoding processor 302 performs a decoding process corresponding the encoding process performed by the encoder 106 of the additional-information superimposing apparatus shown in FIG. 2, such as a data decompression or extension process corresponding to the MPEG encoding.

The first detecting processor 303 and the second detecting processor 304 detect different types of additional information corresponding to a content ID and a user ID, and detect, for example, digital watermark information. The first and second detecting processors 303 and 304 detect spread spectrum (SS) additional information by de-spreading operation for detection based on a correlation of the digital watermark pattern.

Figure 15:
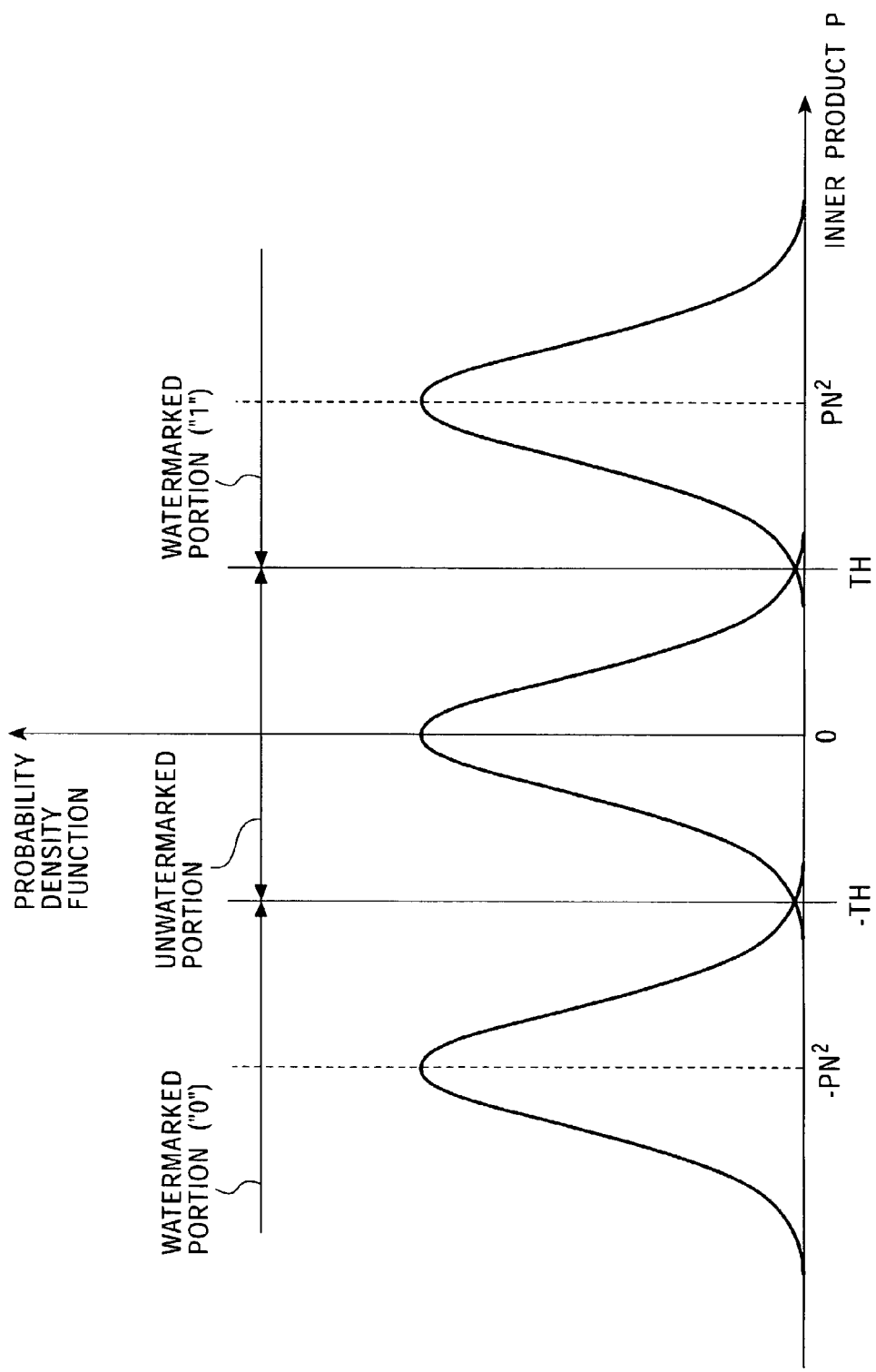
FIG. 15 is a view showing a digital watermark embedding and detecting process.

For example, the inner product P2 of frame data of a digital-watermarked motion image and random-number data PN is calculated to obtain a probability density function which exhibits the distribution of the inner product P2 (see FIG. 15). A certain nonnegative threshold TH is set so as to discriminate portions with and without digital watermarks and to determine the polarity as follows:

| | |
|---|---|
| $P2 \leq -TH$: | watermarked portion (bit 0) |
| $|P2| < TH$: | unwatermarked portion |
| $P2 \geq TH$: | watermarked portion (bit 1) |

Accordingly, the content ID corresponding to the first additional information and the user ID corresponding to the second additional information are detected. If the content ID was detected but the user ID was not detected, the data verifier 305 in the present invention determines that, for example, the coalition attack described above in the Description of the Related Art occurred, and determines that the content is illegally tampered. When the data verifier 305 detects illegally tampered content, it reports the detection to a user via the reporting unit 307. The reporting unit 307 may use various alarming methods such as sound, light, or display indication for notification.

The data verifier 305 refers to the data stored in the delivery record table 306 based on the detected information to determine whether or not the content is legally distributed, and traces a content distribution route. If it is determined that the content is illegally distributed, this information may be reported by, for example, the reporting unit 307 to a content manager or the like via the Internet or the like. In this case, the reporting unit 307 has both functions of reporting the illegal content to a user and reporting routing information of the illegal content to a content manager.

FIG. 11 shows a data structure of the delivery record table 306. The table shown in FIG. 11 is a table for identifying content distribution routes of content delivered to various users, and includes a correspondence between a content ID, a service provider ID of a plurality of content providers and content delivery service providers, and user IDs of users to which the content is delivered.

The content distribution route can be identified by verifying the table data with additional information detected from the content, such as a content ID and a user ID.

For example, if the content is illegally copied for secondary distribution on a network, a plurality of pieces of content having the same user ID exist. Then, it can be determined that the user corresponding to the user ID or the service provider(s) on the content distribution route made illegal copies of the content for secondary distribution of the illegally copied content. The delivery record table 306 may be stored in a different server on a network such as the Internet, and may be referred to, if necessary, each time the data verifier 305 accesses the server.

Content Playback Processing Apparatus

A description is now given of a process for receiving content containing additional information at a user side over a network or via a storage medium and for playing back the content.

Figure 12:
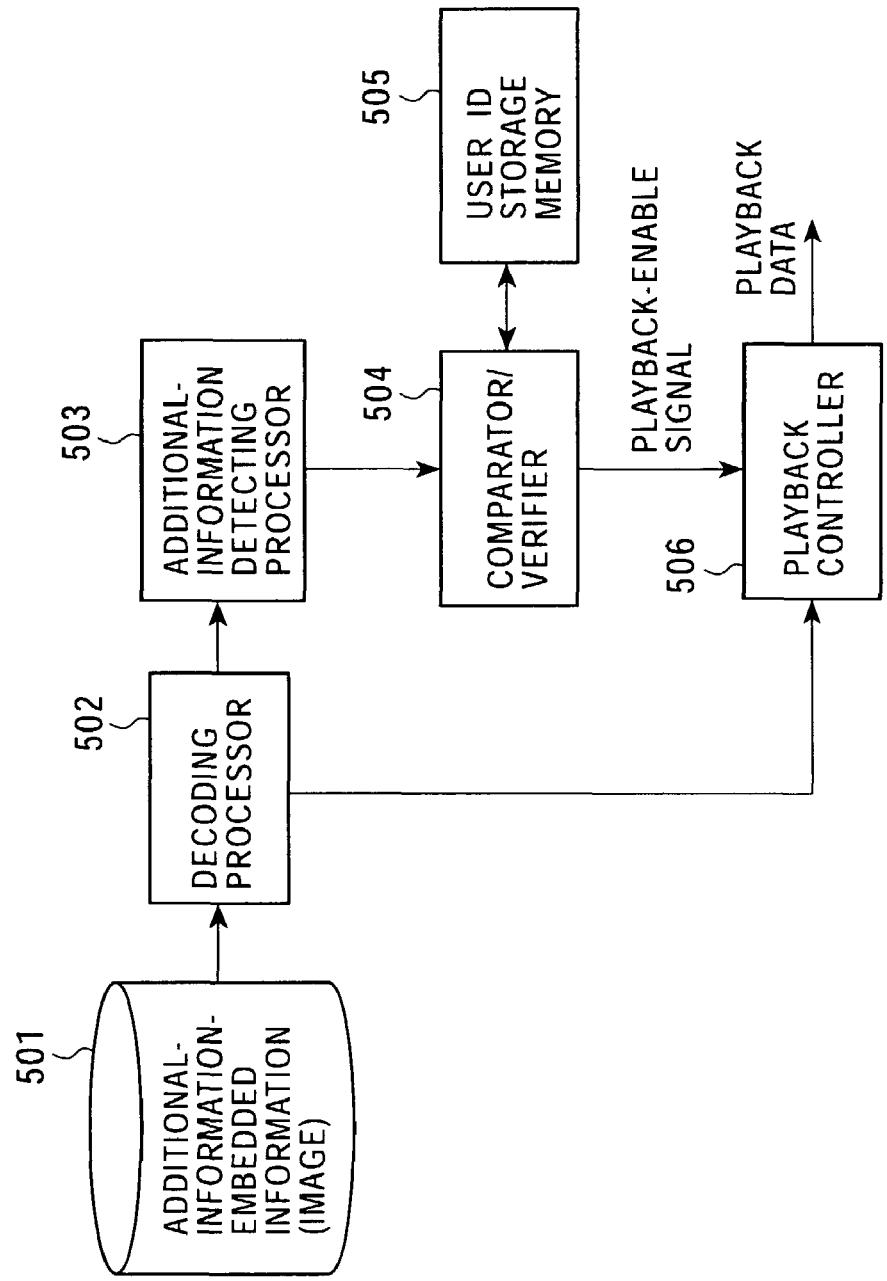
FIG. 12 is a block diagram of a content playback processing apparatus of the present invention.

FIG. 12 is a block diagram of a content playback processing apparatus. As shown in FIG. 12, the content playback processing apparatus of the present invention includes a decoding processor 502, an additional-information detecting processor 503, a comparator/verifier 504, a user ID storage memory 505, and a playback controller 506. The content playback processing apparatus receives additional-information-embedded information 501 to detect additional information such as a digital watermark and to control content playback based on the detected information.

The additional-information-embedded information 501 includes various data such as images, audio data, and program data in which additional information is embedded.

In the following description, image data is played back, by way of example. However, the present invention is not limited to image data, and is generally applicable to various information signals such as audio data and other program information.

The decoding processor 502 performs a decoding process corresponding to the encoding process performed by the encoder 106 of the additional-information superimposing apparatus shown in FIG. 2, such as a data decompression or extension process corresponding to the MPEG encoding.

The additional-information detecting processor 503 detects additional information corresponding to the user ID, and detect, for example, digital watermark information. The additional-information detecting processor 503 detects spread spectrum (SS) additional information by de-spreading operation for detection based on a correlation of the digital watermark pattern.

The comparator/verifier 504 verifies the detected user ID with the user ID stored in the user ID storage memory 505. Since the user ID stored in the user ID storage memory 505 is a user ID submitted to the content provider, the user ID should be verified with the user ID added as additional information to the content when the content is legally delivered and received by an authorized user.

The comparator/verifier 504 verifies the detected user ID with the user ID stored in the user ID storage memory 505, and outputs a playback-enable signal to the playback controller 506 only when both are verified. When both are not verified, the playback-enable signal is not output.

The playback controller 506 plays back the content input from the decoding processor 502 on the condition that the playback-enable signal is input from the comparator/verifier 504.

Since the content is played back only when the user ID stored in the playback apparatus and the user ID added to the content are verified with each other, playback of the content is permitted only on an authorized user's device which has received the legally delivered content. Therefore, for example, playback of a copy of the content would not be permitted on another user's device, thus preventing illegal use of the content.

Figure 13:
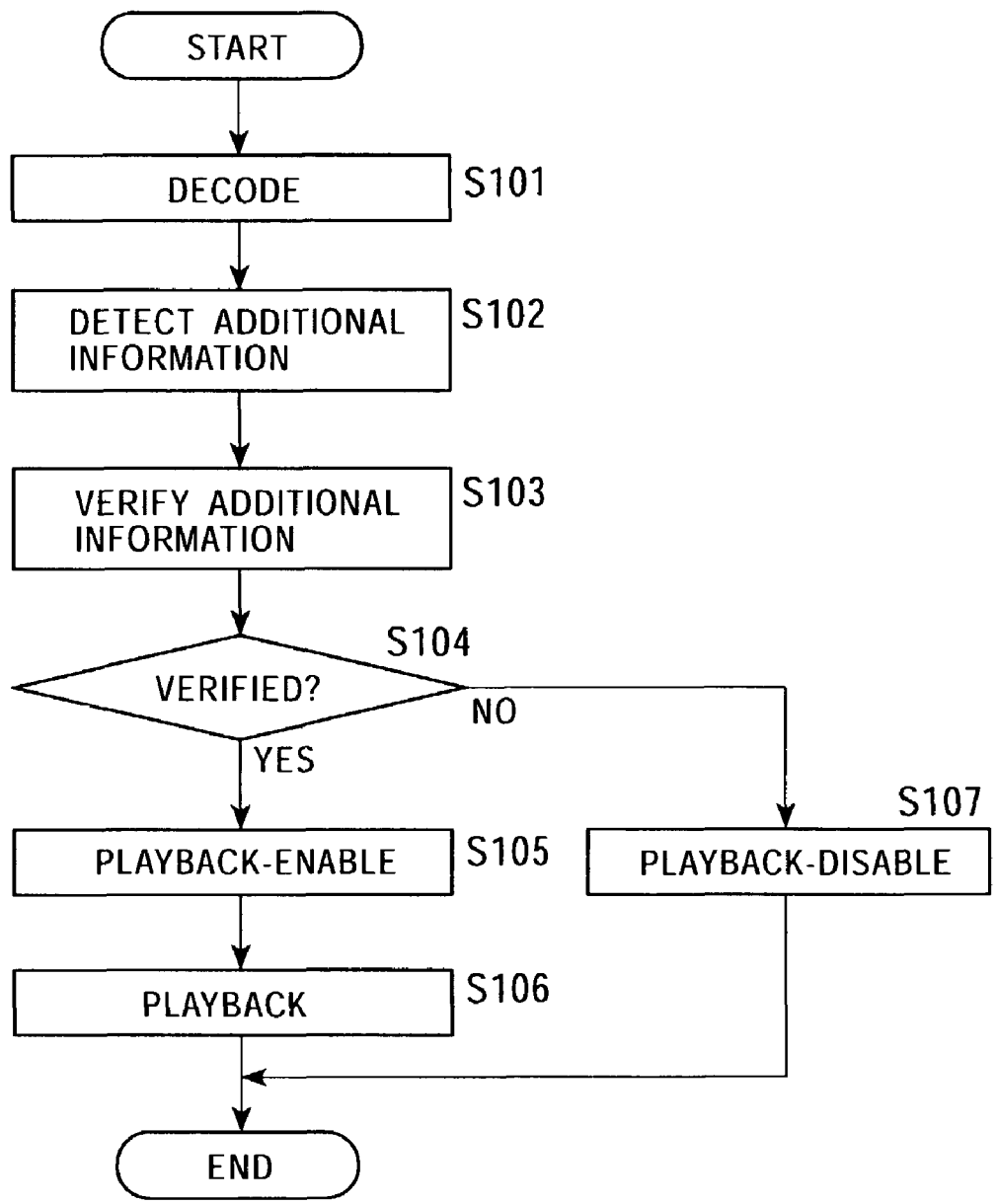
FIG. 13 is a flowchart showing a process routine of the content playback processing apparatus of the present invention.

FIG. 13 is a flowchart showing a process routine of a content playback processing apparatus of the present invention.

First, in step S101, a decoding processor performs a decoding process such as a decoding process corresponding to the MPEG encoding. Then, in step S102, an additional-information detecting processor detects additional information corresponding to a user ID, and, in step S103, a comparator/verifier verifies the detected user ID with a user ID stored in a user ID storage memory.

It is determined in step S104 whether or not both are verified. If the user ID added as additional information to the content is verified with the user ID stored in the user ID storage memory, then, in step S105, a playback-enable signal is output to a playback controller, and the content is played back in step S106.

If it is determined in step S104 that the user ID added as additional information to the content is not verified with the user ID stored in the user ID storage memory, the routine proceeds to step S107, in which the playback-enable signal is not output to disable playback, and the routine ends.

The additional-information superimposing process, the additional-information detecting process, and the content playback process of the present invention have been described. In the foregoing description, a content ID and a user ID are used as an example of information added to content; however, a variety of types of additional information capable of tracing a content distribution route, such as a user ID of a content destination, a content ID, a content provider ID, and a service provider ID, may be superimposed. Preferably, IDs of all entities on a content distribution route are added to the content, resulting in more accurate content distribution route tracing. Information such as the time of content distribution transaction may also be embedded into the content using digital watermarking, steganography or the like, resulting in more detailed content distribution information.

According to the present invention, therefore, since a plurality of different types of additional information capable of tracing a content distribution route, such as a user ID of a content destination, a content ID, a content provider ID, and a service provider ID, are superimposed, for example, when legally distributed content is copied without authorization for secondary distribution, the additional information can be detected from the illegally distributed content to trace a content distribution route to identify the source of the illegally distributed content.

System Configuration

Figure 14:
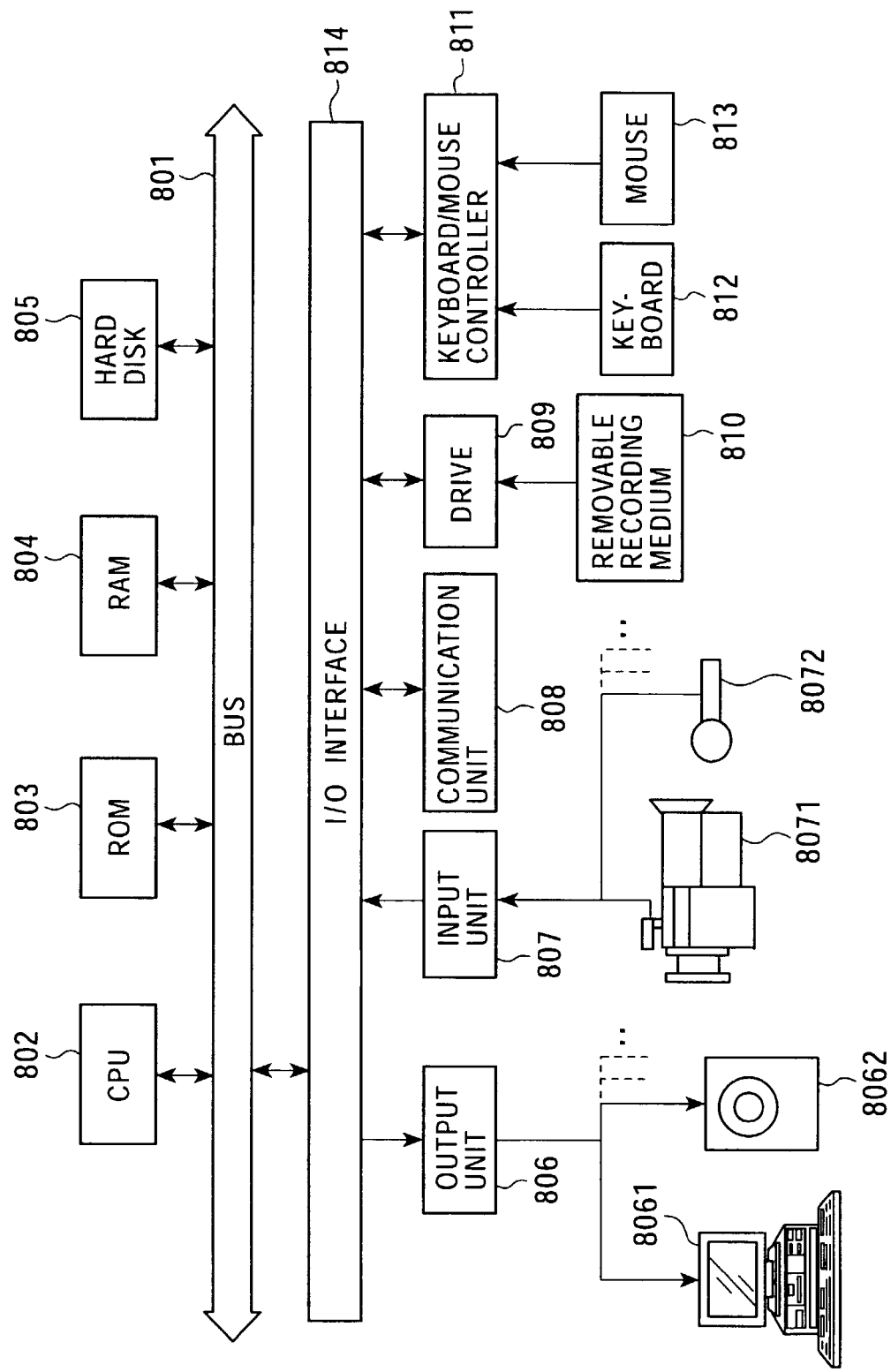
FIG. 14 is a block diagram of a system configuration of the additional-information superimposing and detection processing apparatus and the content playback processing apparatus.

The above-described series of processes, i.e., the additional-information embedding and detecting process, the content playback control process, and so on, can be implemented by hardware or software, or a combination thereof. When it is implemented by software, a program in which the process sequence is recorded can be installed into a memory of a data processor built in dedicated hardware for execution, or the program can be installed into a general-purpose computer capable of executing various processes for execution. When the series of processes is implemented by software, a program constituting the software is installed into, for example, a general-purpose computer, a one-chip microcomputer, or the like. FIG. 14 illustrates a system configuration of an apparatus for executing the above-described additional-information detecting or embedding process or content playback control process.

A CPU (central processing unit) 802 actually executes various application programs or OS (operating system). A ROM (read-only memory) 803 stores the programs executed by the CPU 802 or fixed data as computation parameters. A RAM (random access memory) 804 is used as a storage area and a work area for a program executed by the CPU 802 and time-varying parameters during the program processing. The CPU 802, the ROM 803, the RAM 804, and a hard disk 805 are connected with each other via a bus 801 so that data can be transferred therebetween. The data can also be transferred from and to various input and output devices connected to an input/output interface 814.

A keyboard 812 and a mouse 813 are operated by a user for inputting various commands to the CPU 802, and are operated by a user for entering command input data, which is input via a keyboard/mouse controller 811.

A drive 809 is a drive for activating recording and playback operations of a removable recording medium 810 such as a flexible disc, a CD-ROM (compact disc read only memory), an MO (magneto-optical) disc, a DVD (digital versatile disc), a magnetic disc, or a semiconductor memory to play back a program or data from the removable recording medium 810 or to store a program or data to the removable recording medium 810.

When a command is input via the input/output interface 814 using the keyboard 812, the mouse 813, etc., the CPU 802 executes the program stored in the ROM 803 according to the input command.

Data such as images and audio data to be processed by the apparatuses of the above-described embodiment can be entered from an input device such as a camera 8071 connected to an input unit 807 or a data input device such as a scanner, or from the removable recording medium 810 connected to the drive 809, such as a flexible disc, a CD-ROM, an MO disc, a DVD, a magnetic disc, or a semiconductor memory. In this system, audio data can also be input via a microphone 8072. Data received via a communication unit 808 can also be processed. The data, such as images and sounds, which is processed according to the present invention is played back by a computer device 8061 having a monitor, a speaker 8062, or the like via an output unit 806.

The CPU 802 can load to the RAM 804 for execution a program stored in the ROM 803, a program stored in the hard disc 805, a program received by the communication unit 808 via a satellite or a network and installed into the hard disc 805, or a program read from the removable recording medium 810 attached to the drive 809 and installed into the hard disk 805.

Throughout the specification, the program may be processed by a single computer or may be distributed and processed by a plurality of computers. The program may also be transferred to a remote computer for execution.

The present invention has been described in detail with reference to the specific embodiment. However, it is obvious that modifications or replacements may also be made to the illustrated embodiment by those skilled in the art without departing from the scope and spirit of the present invention. The above embodiment of the present invention is merely one exemplary form, and should not be construed as the restricted one. Consequently, reference should be made to the appended claims for precise delineation of the true scope of the present invention.

What is claimed is:

1. An additional-information detection processing apparatus comprising:

a receiver configured to receive a content including additional information superimposed thereon and to detect the additional information that includes i) an identifier of a user; ii) a content identifier unique to the content; and iii) a plurality of delivery service provider identifiers, each of the plurality of delivery service provider identifiers corresponding to a delivery service provider that distributes the content along a portion of a content distribution route;

a memory configured to receive and to store correspondence information indicating a correspondence among an identifier of a user who is authorized to receive the content, the content identifier unique to the content, and the plurality of delivery service provider identifiers;

a data verifier configured to detect illegal tampering or distribution of the content by comparing the identifier of the user in the additional information detected by said receiver with the identifier of the user who is authorized to receive the content in the correspondence information, and comparing the plurality of delivery service provider identifiers in the additional information detected by said receiver with the plurality of delivery service provider identifiers in the correspondence information, the correspondence information being stored in a delivery record table connected to the data verifier; and a detecting processor configured to detect the superimposed additional information, and to calculate an inner product of at least a portion of the detected superimposed additional information and a random number, the random number having been used to encode the portion of superimposed additional information, to generate a probability density function of the product, wherein the data verifier detects illegal tampering or distribution of the content based on a comparison of the generated probability density function with a predetermined threshold.

2. The additional-information detection processing apparatus according to claim 1, wherein:

the additional information comprises digital watermark information that is embedded in the content as a digital watermark; and said receiver is further configured to detect the digital watermark information.

3. The additional-information detection processing apparatus according to claim 1, wherein the delivery service providers forward the content from a content provider or another service provider to the user, and the additional information further includes a content provider identifier unique to the content provider.

4. The additional-information detection processing apparatus according to claim 3, wherein only the content provider creates the content.

5. The additional-information detection processing apparatus according to claim 1, wherein said delivery record table includes correspondence information indicating a correspondence between plural content identifiers, plural user identifiers of user authorized to receive the content, plural content provider identifiers, and the plurality of delivery service provider identifiers.

6. The additional-information detection processing apparatus according to claim 1, wherein:

the additional information comprises steganography information that is embedded in the content; and said receiver is further configured to detect the steganography information.

7. The additional-information detection processing apparatus of claim 1, further comprising:

a reporting unit configured to report the illegal tampering or distribution of the content based on the data verification result.

8. The additional-information detection processing apparatus according to claim 1, wherein the delivery service providers do not create or modify the content.

9. The additional-information detection processing apparatus according to claim 1, wherein the delivery service providers only distribute the content.

10. A content playback processing apparatus for playing back a content, comprising:
   a receiver configured to receive the content having additional information superimposed thereon and to detect the additional information including a user identifier, a content identifier unique to the content, and a plurality of delivery service provider identifiers, each of the plurality of delivery service provider identifiers corresponding to a delivery service provider that distributes the content along a portion of a content distribution route;
   a memory configured to receive and to store correspondence information indicating a correspondence among an apparatus user identifier that identifies a user of the apparatus who is authorized to receive the content, the content identifier unique to the content, and the plurality of delivery service provider identifiers;
   a verifier configured to compare the user identifier included in the additional information and the apparatus user identifier that identifies the user of the apparatus who is authorized to receive the content stored in said memory prior to the receiver receiving the content, configured to compare the plurality of delivery service provider identifiers in the additional information detected by said receiver with the plurality of delivery service provider identifiers stored in said memory prior to the receiver receiving the content, and configured to verify the additional information superimposed on the content by comparing the additional information detected by said receiver with the correspondence information, the correspondence information being stored in a delivery record table connected to the verifier;
   a playback controller configured to play back the content on a condition that said verifier determines that the user identifier and the apparatus user identifier are verified with each other; and
   a detecting processor configured to detect the superimposed additional information, and to calculate an inner product of at least a portion of the detected superimposed additional information and a random number, the random number having been used to encode the portion of superimposed additional information, to generate a probability density function of the product, wherein
   the verifier detects illegal tampering or distribution of the content based on a comparison of the generated probability density function with a predetermined threshold, and
   the playback controller plays the content only when the verifier determines that the content is legally distributed without tampering based on the comparison of the generated probability density function with the predetermined threshold.

11. An additional-information detection processing method performed using an additional-information detection apparatus, the method comprising:
   receiving, at the additional-information detection apparatus, content having additional information superimposed thereon, the additional information including an identifier of a user, a content identifier unique to the content, and a plurality of delivery service provider identifiers, each of the plurality of delivery service provider identifiers corresponding to a delivery service provider that distributes the content along a portion of a content distribution route;
   detecting the additional information;
   receiving and storing in a memory of the additional-information detection apparatus correspondence information indicating a correspondence among an identifier of a user who is authorized to receive the content, the content identifier unique to the content, and the plurality of delivery service provider identifiers;
   verifying the detected additional information superimposed on the content by comparing the plurality of delivery service provider identifiers detected in the additional information with the plurality of delivery service provider identifiers in the correspondence information stored prior to receiving the content, and by comparing the identifier of the user in the detected additional information with the identifier of the user who is authorized to receive the content in the correspondence information stored prior to receiving the content; and
   detecting an illegal tampering or distribution of the content based on a data verification result obtained in said data verifying, wherein
   the detecting the additional information includes calculating an inner product of at least a portion of the detected superimposed additional information and a random number, the random number having been used to encode the portion of superimposed additional information, and generating a probability density function of the product, and
   the verifying the detected additional information includes detecting illegal tampering or distribution of the content based on a comparison of the generated probability density function with a predetermined threshold.

12. The additional-information detection processing method according to claim 11, wherein:
   the additional information comprises digital watermark information that is embedded in the content as a digital watermark; and
   said detecting includes detecting the digital watermark information.

13. The additional-information detection processing method according to claim 11, wherein the delivery service providers forward the content from a content provider or another service provider to the user, and the additional information further includes a content provider identifier unique to the content provider.

14. The additional-information detection processing method according to claim 11, wherein the storing correspondence information includes storing correspondence information indicating a correspondence between plural content identifiers, plural user identifiers of users authorized to receive the content, plural content provider identifiers, and the plurality of delivery service provider identifiers.

15. The additional-information detection processing method according to claim 11, wherein:
   the additional information comprises steganography information that is embedded in the content; and
   said detecting the additional information includes detecting the steganography information.

16. The additional-information detection processing method of claim 11, further comprising:
   reporting the illegal tampering or distribution of the content based on the data verification result.

17. A content playback processing method for playing back a content on a playback apparatus, the method comprising:

receiving, at the playback apparatus, the content having additional information superimposed thereon;

detecting a user identifier, a plurality of delivery service provider identifiers, each of the plurality of delivery service provider identifiers corresponding to a delivery service provider that distributes the content along a portion of a content distribution route, and a content identifier unique to the content contained in the additional information;

receiving and storing in a memory of the playback apparatus correspondence information indicating a correspondence among an apparatus user identifier that identifies a user of the playback apparatus who is authorized to receive the content, a plurality of delivery service provider identifiers, and the content identifier unique to the content;

verifying the detected user identifier included in the additional information by comparing the plurality of delivery service provider identifiers detected in the additional information with the plurality of delivery service provider identifiers stored prior to the receiving in the memory of the playback apparatus, and by comparing the detected user identifier with the apparatus user identifier stored prior to the receiving in the memory of the playback apparatus; and playing back the content on a condition that said verifying determines that the user identifier and the apparatus user identifier are verified with each other, wherein the detecting includes calculating an inner product of at least a portion of the detected superimposed additional information and a random number, the random number having been used to encode the portion of superimposed additional information, and generating a probability density function of the product, the verifying the detected additional information includes detecting illegal tampering or distribution of the content based on a comparison of the generated probability density function with a predetermined threshold, and the playing back the content includes playing the content only when the verifying determines that the content is legally distributed without tampering based on the comparison of the generated probability density function with the predetermined threshold.

18. A non-transitory computer readable medium storing a computer program, which when executed on a computer, causes the computer to execute an additional-information detecting process comprising:

receiving, at the computer, content including additional information superimposed thereon, the additional information including an identifier of a user, a plurality of delivery service provider identifiers, each of the plurality of delivery service provider identifiers corresponding to a delivery service provider that distributes the content along a portion of a content distribution route, and a content identifier unique to the content;

detecting the additional information;

receiving and storing in the computer correspondence information indicating a correspondence among an identifier of a user who is authorized to receive the content, the plurality of delivery service provider identifiers, and the content identifier unique to the content;

verifying the additional information superimposed on the content by comparing the plurality of delivery service provider identifiers detected in the additional information with the plurality of delivery service provider identifiers in the correspondence information stored prior to receiving the content by comparing the identifier of the user in the additional information with the identifier of the user who is authorized to receive the content in the correspondence information stored prior to receiving the content; and detecting an illegal tampering or distribution of the content based on a data verification result obtained in said data verifying, wherein the detecting the additional information includes calculating an inner product of at least a portion of the detected superimposed additional information and a random number, the random number having been used to encode the portion of superimposed additional information, and generating a probability density function of the product, and the verifying the detected additional information includes detecting illegal tampering or distribution of the content based on a comparison of the generated probability density function with a predetermined threshold.

19. The non-transitory computer readable medium of claim 18, wherein the computer program further causes the computer to execute:

reporting the illegal tampering or distribution of the content based on the data verification result.

20. A non-transitory computer readable medium storing a program, which when executed on a computer causes the computer to perform a content playback process comprising:

receiving, at the computer, a content having additional information superimposed thereon;

detecting a user identifier, a plurality of delivery service provider identifiers, each of the plurality of delivery service provider identifiers corresponding to a delivery service provider that distributes the content along a portion of a content distribution route, and a content identifier unique to the content contained in the additional information;

receiving and storing in a memory of the computer correspondence information indicating a correspondence among an apparatus user identifier that identifies a user of the playback process who is authorized to receive the content and the content identifier unique to the content, and the plurality of delivery service provider identifiers;

verifying the detected user identifier included in the additional information by comparing the plurality of delivery service provider identifiers detected in the additional information with the plurality of delivery service provider identifiers stored prior to the receiving in the memory of the computer, by comparing the detected user identifier with the apparatus user identifier stored prior to the receiving in the memory of the computer; and playing back the content on a condition that the detected user identifier is verified by the verifying, wherein the detecting includes calculating an inner product of at least a portion of the detected superimposed additional information and a random number, the random number having been used to encode the portion of superimposed additional information, and generating a probability density function of the product, the verifying the detected additional information includes detecting illegal tampering or distribution of the content based on a comparison of the generated probability density function with a predetermined threshold, and the playing back the content includes playing the content only when the verifying determines that the content is legally distributed without tampering based on the comparison of the generated probability density function with the predetermined threshold.

* * * * *